United States Patent [19]
Klomp Edward D.

[11] 3,916,845
[45] Nov. 4, 1975

[54] INTERNAL COMBUSTION ROTARY ENGINE

[75] Inventor: Klomp Edward D., Mount Clemens, Mich.

[73] Assignee: General Motors Corporation, Detroit, Mich.

[22] Filed: May 31, 1974

[21] Appl. No.: 474,893

[52] U.S. Cl. .............. 123/8.45; 123/108; 251/326
[51] Int. Cl.² ........................................ F02B 53/06
[58] Field of Search.................. 123/8.01, 8.45, 108; 251/326; 418/61 A

[56] References Cited
UNITED STATES PATENTS

| | | |
|---|---|---|
| 3,514,235 | 5/1970 | Yamauchi................... 123/8.45 UX |
| 3,820,691 | 6/1974 | Saur................................ 251/326 X |
| 3,844,256 | 10/1974 | Ishikawa et al..................... 123/8.45 |

Primary Examiner—C. J. Husar
Assistant Examiner—Michael Koczo, Jr.
Attorney, Agent, or Firm—Ronald L. Phillips

[57] ABSTRACT

A flexible vane is slidably mounted for movement in an arcuate path in a groove in the peripheral intake port of an internal combustion rotary engine and is operated to control intake flow direction and velocity and also overlap between intake and exhaust.

2 Claims, 4 Drawing Figures

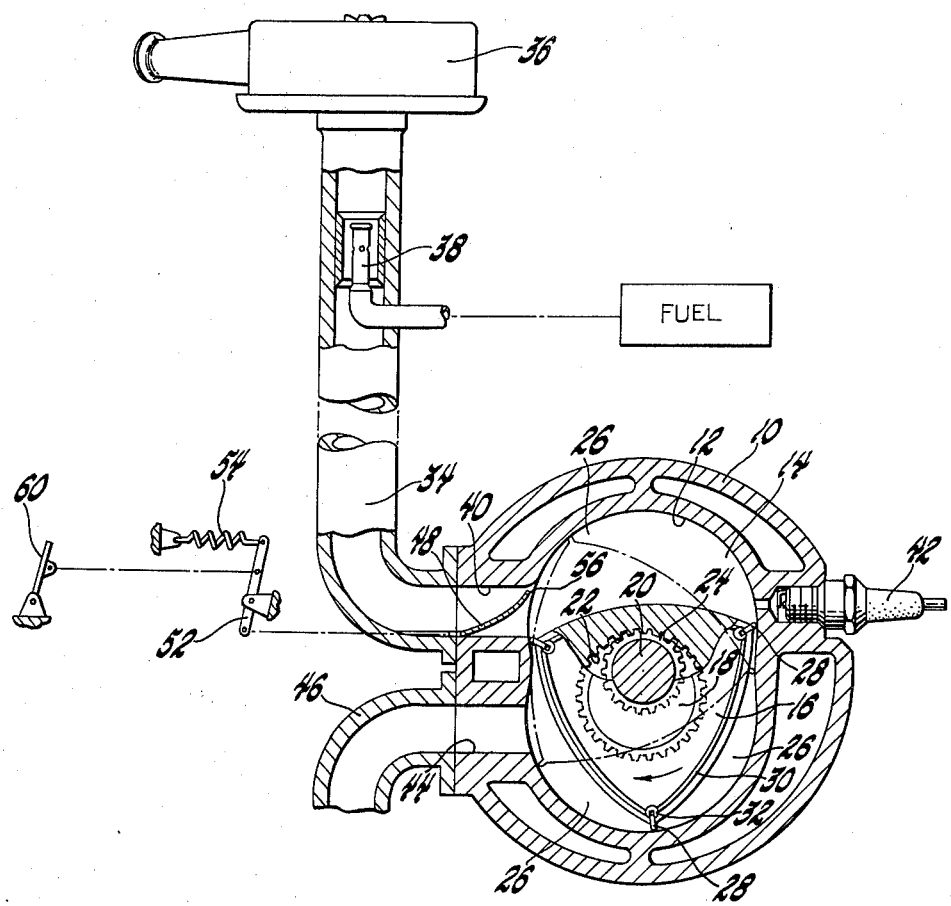
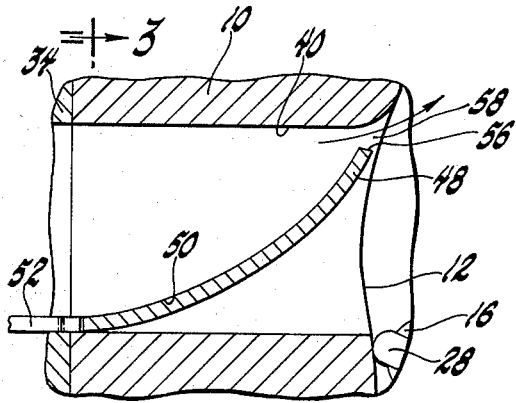
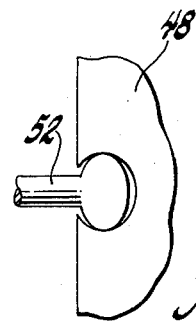
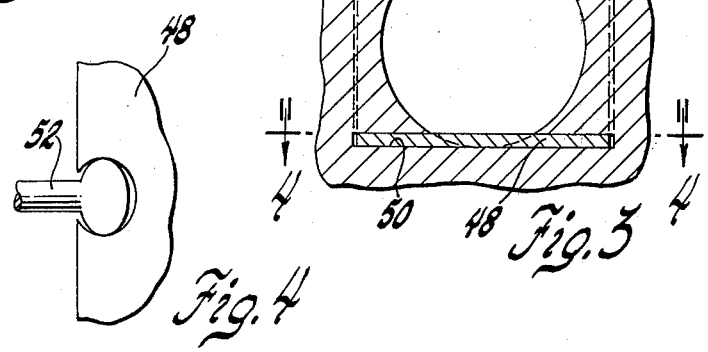

INTERNAL COMBUSTION ROTARY ENGINE

This invention relates to an internal combustion rotary engine and more particularly to an internal combustion rotary engine having peripheral intake port throttling.

Various intake port throttling arrangements have been proposed for internal combustion rotary engines such as found in U.S. Pat. Nos. 3,347,213; 3,411,487; 3,585,972; 3,362,385 and 3,780,706. However, none of the known prior arrangements provide what are believed to be the three most important advantages possible with intake port throttling at part load conditions; namely 1. directional control of intake flow for good combustion chamber flow patterns,
2. increased port velocities at the flow entrance into the combustion chambers for good fuel atomization and rapid combustion, and
3. controlled overlap between intake and exhaust for low residual fractions and lean operation.

These advantages are all made possible by the peripheral intake port throttling arrangement according to the present invention wherein a flexible vane is mounted in a groove in the peripheral intake port of an internal combustion rotary engine with this groove guiding the vane for movement in an arcuate path under the control of the operator. At minimum load the end of the flexible vane is located close to the intake port exit with the bend of the vane directing the intake flow in the direction of rotor rotation through a reduced flow area and thus at increased velocity while minimizing the amount of overlap between the peripheral intake port and a peripheral exhaust port for good idle performance. At increasing part loads, the flexible vane is retracted while continuing to direct intake flow in the direction of rotor rotation at increased velocity but with the flow area increasing until the full flow area is opened for maximum volumetric efficiency.

An object of the present invention is to provide a new and improved internal combustion rotary engine with peripheral intake port throttling.

Another object is to provide in an internal combustion rotary engine an operator controlled flexible vane mounted in a peripheral intake port providing minimum intake and exhaust overlap at idle and under part load conditions directing intake flow in the direction of rotor rotation at increased velocities into the combustion chambers.

These and other objects of the present invention will be more apparent from the following description and drawing in which:

FIG. 1 is view with parts in section and parts shown schematically of an internal combustion rotary engine with peripheral intake port throttling according to the present invention.

FIG. 2 is an enlarged view of the peripheral intake port throttling arrangement in FIG. 1.

FIG. 3 is a view taken on the line 3—3 in FIG. 2.

FIG. 4 is a view taken on the line 4—4 in FIG. 3.

Referring to FIG. 1, the present invention is shown in use in an internal combustion rotary engine of present commercial type. The engine includes a housing 10 having an inwardly facing peripheral wall 12 and a pair of oppositely facing end walls 14, only one shown, which cooperate to provide a cavity in which is located a rotor 16. The rotor 16 is rotatably mounted on an eccentric 1 of a crankshaft 20 which in turn is rotatably mounted on opposite sides of the rotor in the engine housing 10. The rotor has an internal tooth rotary phasing gear 22 on one side thereof which is concentric with the hub thereof and meshes with an annular external tooth stationary phasing gear 24 which is received about the crankshaft on the same side of the rotor and is made stationary by being fixed to the engine housing 10. The rotary phasing gear 22 has one and one-half times the number of teeth as the stationary phasing gear 24 and the internal peripheral wall 12 has the shape of a two-lobe epitrochoid or a curve parallel thereto. The rotor 16 has three lobes which cooperate with the peripheral wall 12 and the end walls 14 to provide three combustion or working chambers 26 that are spaced about the rotor and move therewith while varying in volume in fixed phase relation to the engine housing while the rotor apexes remain adjacent the peripheral wall. Chamber sealing is provided by spring-biased apex seals 28 which are mounted at the apexes of the rotor and slide on the peripheral wall 12, spring-biased side seals 30 which are mounted in each rotor side and extend adjacent the rotor lobes between the apexes and slide on the opposite end wall, and spring-biased corner seals 32 which are mounted in the rotor sides near the rotor apexes and provide sealing links between the adjacent ends of the side seals and the adjacent end of the apex seals while sliding on the opposite end wall.

The engine's induction system comprises an intake manifold 34 which delivers a mixture of air from an air cleaner 36 and fuel from a nozzle 38 to a peripheral intake port 40 in the housing 10 which extends through the peripheral wall 12 to connect between the apex seals with the working chambers as they expand in the intake phase as the rotor turns in the direction of the arrow. The working chambers are then closed by their trailing apex seal to the peripheral intake port and the trapped fuel mixture is then compressed. At or near top-dead-center, the compressed fuel mixture is ignited by a spark plug 42 which is supplied with voltage at the proper time from an ignition system, not shown. With ignition, the peripheral wall 12 takes the reaction of the combustion forcing the rotor 16 to continue rotating in the expansion or power phase and eventually the leading apex seal of the chamber in which combustion has occurred passes a peripheral exhaust port 44 through the peripheral wall 12 whereafter the exhaust gas is forced outward to an exhaust manifold 46 as the chamber contracts in the exhaust phase. As shown by the dashed line rotor position in FIG. 1, when the rotor is at a chamber's bottom-dead-center position there is connection or overlap between the peripheral exhaust port 44 and the peripheral intake port 40. While this may be desirable for internal exhaust gas recirculation to reduce certain emissions, too much overlap can cause poor idle performance. To avoid excessive overlap, it is common practice to locate the intake porting in the end walls where the rotor sides rather than the rotor apexes control intake port opening. While the side intake porting can be selected to provide a certain overlap or no overlap for good idle performance, its characteristics are such that it may not provide comparable volumetric efficiency.

In the peripheral intake port throttling arrangement according to the present invention, there is provided a flexible vane 48 of metal that is rectangular in cross-section and is slidably mounted in an accommodating groove 50 that is machined in opposite sides of the peripheral intake port 40 and the aligned passage in the intake manifold 34. The portion of groove 50 in the intake port 40 is curved or arcuate shaped as shown in FIGS. 1 and 2 to force the vane 48 to bend into the normal intake port flow area in the direction of rotor rotation. The portion of the groove 50 in the intake manifold 34 is straight so that as the vane 48 is retracted it is straightened as it proceeds out of the flow area. The position of the flexible vane 48 is controlled by linkage 52 which includes a spring 54 that normally biases the flexible vane 48 to the position shown in FIGS. 1 and 2 where its leading edge 56 is located as close as possible to the exit of the exhaust port 40 to thus reduce the amount of overlap while leaving a predetermined open flow area 58 which is calibrated for good idle performance. With this arrangement and as the fuel mixture passes to the intake port 40, it is directed by the vane 48 in the direction of rotor rotation to produce good chamber flow pattern while delaying the occurrence of overlap until the rotor apexes pass the advanced vane edge 56. In addition to the change in flow direction, flow area 58 is greatly reduced from the potential wide open flow area of the intake port 40 so that the flow is greatly accelerated by the narrowed curved passage just as it enters the expanding working chambers to provide good fuel atomization and more rapid combustion. The linkage 52 further includes a foot pedal 60 that is pushed by the operator to retract the flexible vane 48. As the vane 48 is retracted at part load conditions, the vane remains curved or bent near its exit edge 56 to continue directing the intake flow in the direction of rotor rotation for desirable chamber flow patterns while the effective flow area 58 increases but is still less than the full flow area of the peripheral intake port 40 so that there is still provided increased velocities near the flow entrance into the working chambers for good fuel atomization and more rapid combustion. In addition, with the retraction of the vane 48 the overlap barrier is removed so that the intake-exhaust port overlap is then substantially normal and provides internal exhaust gas recirculation with the amount of the overlap then not being dependent upn meeting idle conditions. At full or wide open throttle, the vane 48 is fully retracted out of the normal flow area of the intake port 40 for maximum fuel flow and volumetric efficiency.

The above described embodiment is illustrative of the invention which may be modified within the scope of the appended claims.

I claim:

1. An internal combustion rotary engine comprising a housing having a pair of inner end walls and an inner peripheral wall defining a cavity, a rotor disposed in said cavity, crankshaft rotatably supported by said housing and having an eccentric rotatably supporting said rotor, said rotor and said walls cooperatively providing a plurality of variable volume chambers that are spaced around the move with said rotor while varying in volume as said rotor and said crankshaft turn, said housing having a peripheral intake port extending through said peripheral wall in a location so as to periodically open to said chambers as said chambers expand to deliver an air-fuel mixture thereto and is then closed to said chambers as they contract to compress the air-fuel mixture, means for igniting the compressed air-fuel mixture in said chambers, said housing having an exhaust port extending through one of said walls in a location so as to periodically open to said chambers as they contract in an exhaust phase following an expansion or power phase, and a flexible vane slidably mounted in a curved groove in oppositte sides of said peripheral intake port extending transverse to the flow direction through said intake port, said vane having an exit edge that is positionable by sliding vane movement at the exit of said intake port to reduce the normal overlap between said intake and exhaust ports while said groove flexes said vane to form a narrowed flow area along a curved path that directs flow at an increased velocity into said chambers in the direction of rotor rotation, said vane being further positionable in said groove to restore the normal overlap while continuing to provide a narrowed flow area along a curved path for directing the intake flow at increased velocities into said chambers in the direction of rotor rotation and being further positionable to fully open said intake port.

2. An internal combustion rotary engine comprising a housing having a pair of inner end walls and an inner two-lobe peripheral wall defining a cavity, a three-lobe rotor disposed in said cavity, a crankshaft rotatably supported by said housing and having an eccentric rotatably supporting said rotor, said rotor and said walls cooperatively providing three variable volume chambers that are spaced around and move with said rotor while varying in volume as said rotor and said crankshaft turn, said housing having a peripheral intake port extending through said peripheral wall in a location so as to periodically open to said chambers as said chambers expand to deliver an air-fuel mixture thereto and is then closed to said chambers as they contract to compress the air-fuel mixture, means for igniting the compressed air-fuel mixture in said chambers, said housing having a peripheral exhaust port extending through said peripheral wall in a location so as to periodically open to said chambers as they contract in an exhaust phase following an expansion or power phase, and flexible vane means mounted in a curved groove in opposite sides of said peripheral intake port for directing the air-fuel mixture at the entrance to said chambers in the direction of rotor rotation while providing minimum overlap between said peripheral exhaust port and said peripheral intake port and also providing a minimum flow area to increase the velocity of the mixture at the entrance to said chambers at a minimum load condition in a fully extended flexed position and flexing on movement in a retracting direction to maintain the mixture flowing in the direction of rotor rotation while providing increasing flow area less than the full flow area of said peripheral intake port at increasing part load conditions and opening to the full flow area at a full load condition.

* * * * *

UNITED STATES PATENT AND TRADEMARK OFFICE
CERTIFICATE OF CORRECTION

PATENT NO. : 3,916,845
DATED : November 4, 1975
INVENTOR(S) : Edward D. Klomp

It is certified that error appears in the above-identified patent and that said Letters Patent are hereby corrected as shown below:

Column 1, line 52, after "is" insert -- a --; line 67, numeral "1" should read -- 18 --.
Column 3, line 43, "upn" should read -- upon --; line 54, after "cavity" insert -- a --.

Signed and Sealed this twenty-seventh Day of April 1976

[SEAL]

Attest:

RUTH C. MASON
Attesting Officer

C. MARSHALL DANN
Commissioner of Patents and Trademarks